Dec. 31, 1968     V. SANGIMINO     3,419,304
AUTOWAGON
Filed Jan. 16, 1967     Sheet 1 of 7
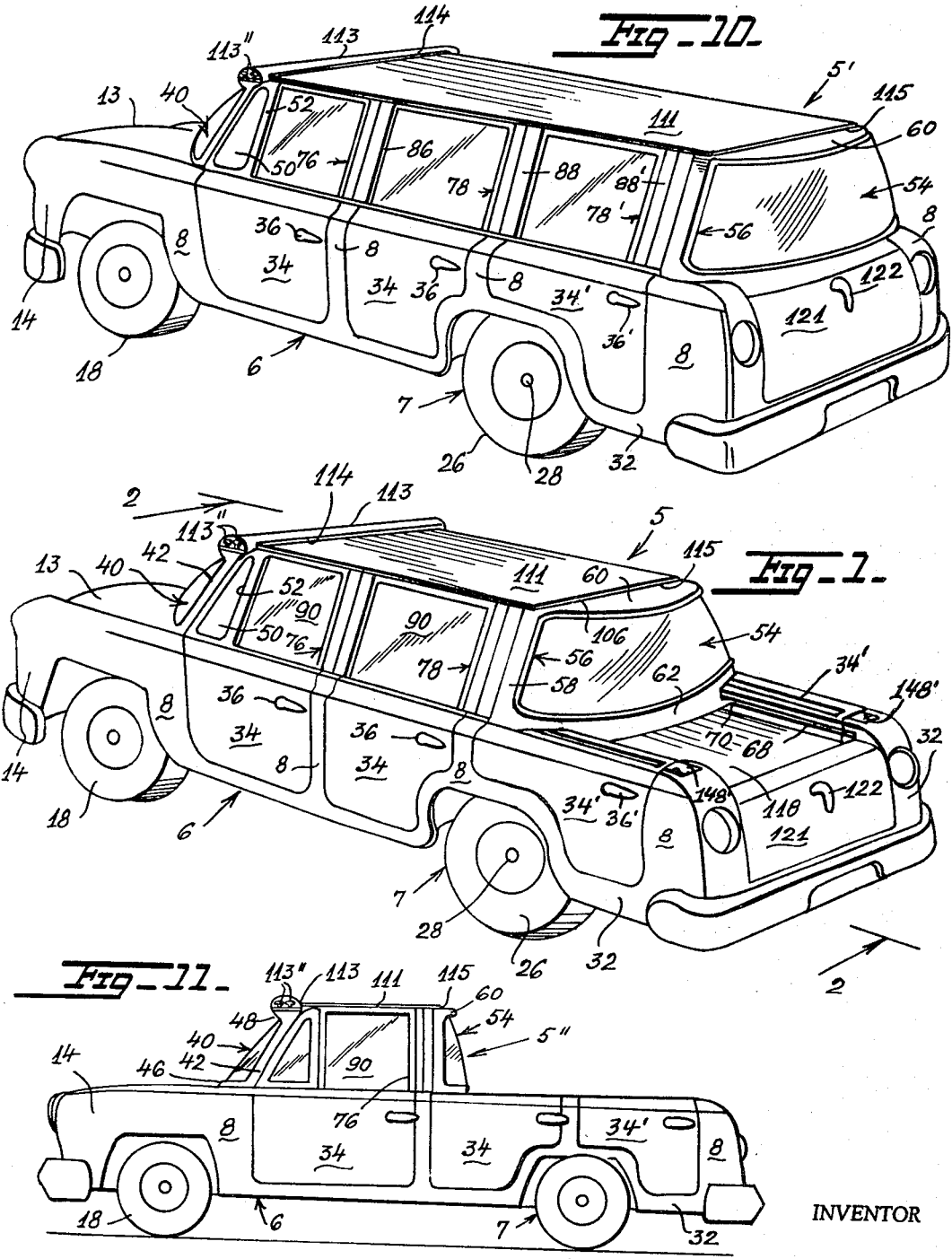
INVENTOR
Vito Sangimino
BY Polachek & Saulsbury
ATTORNEYS

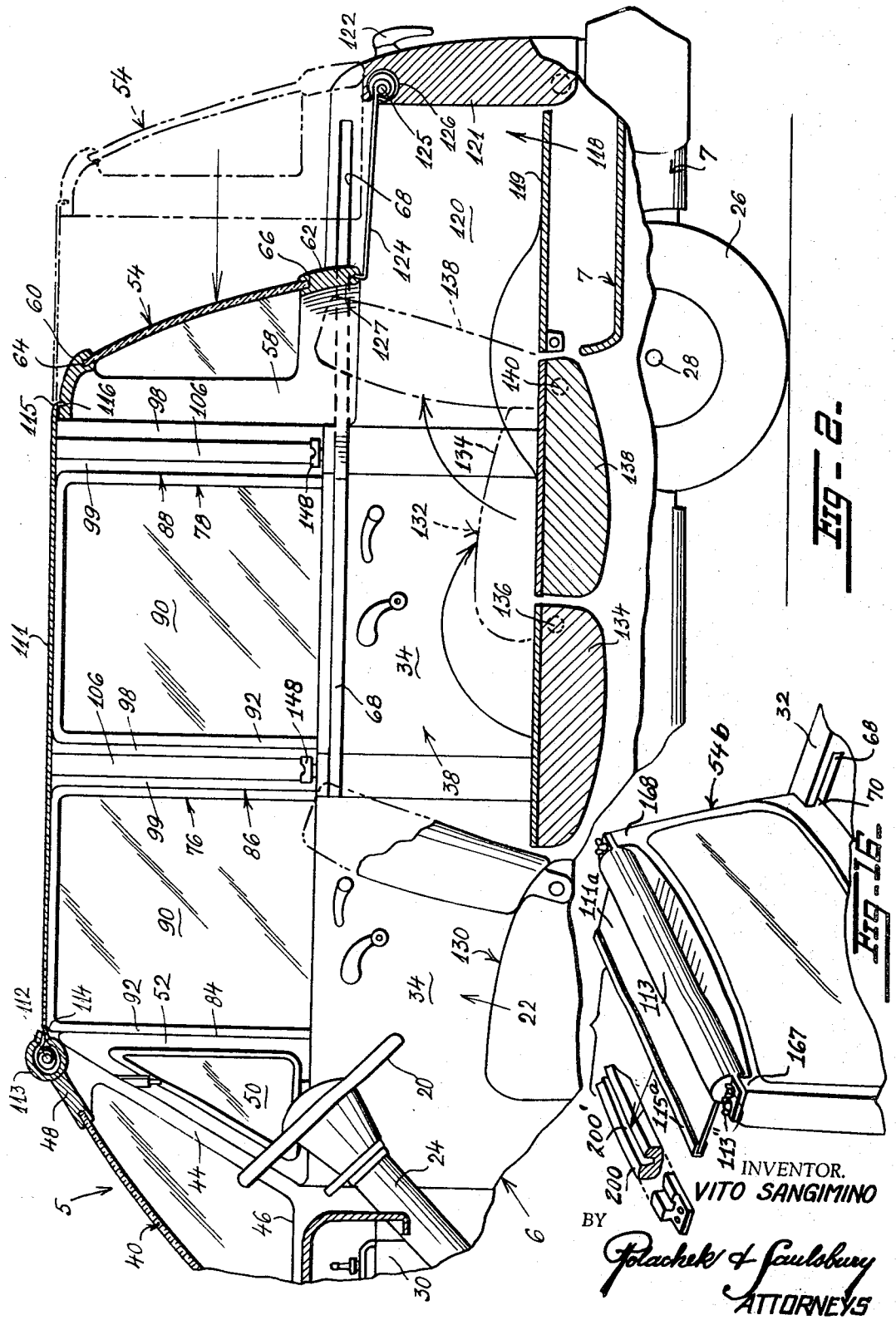

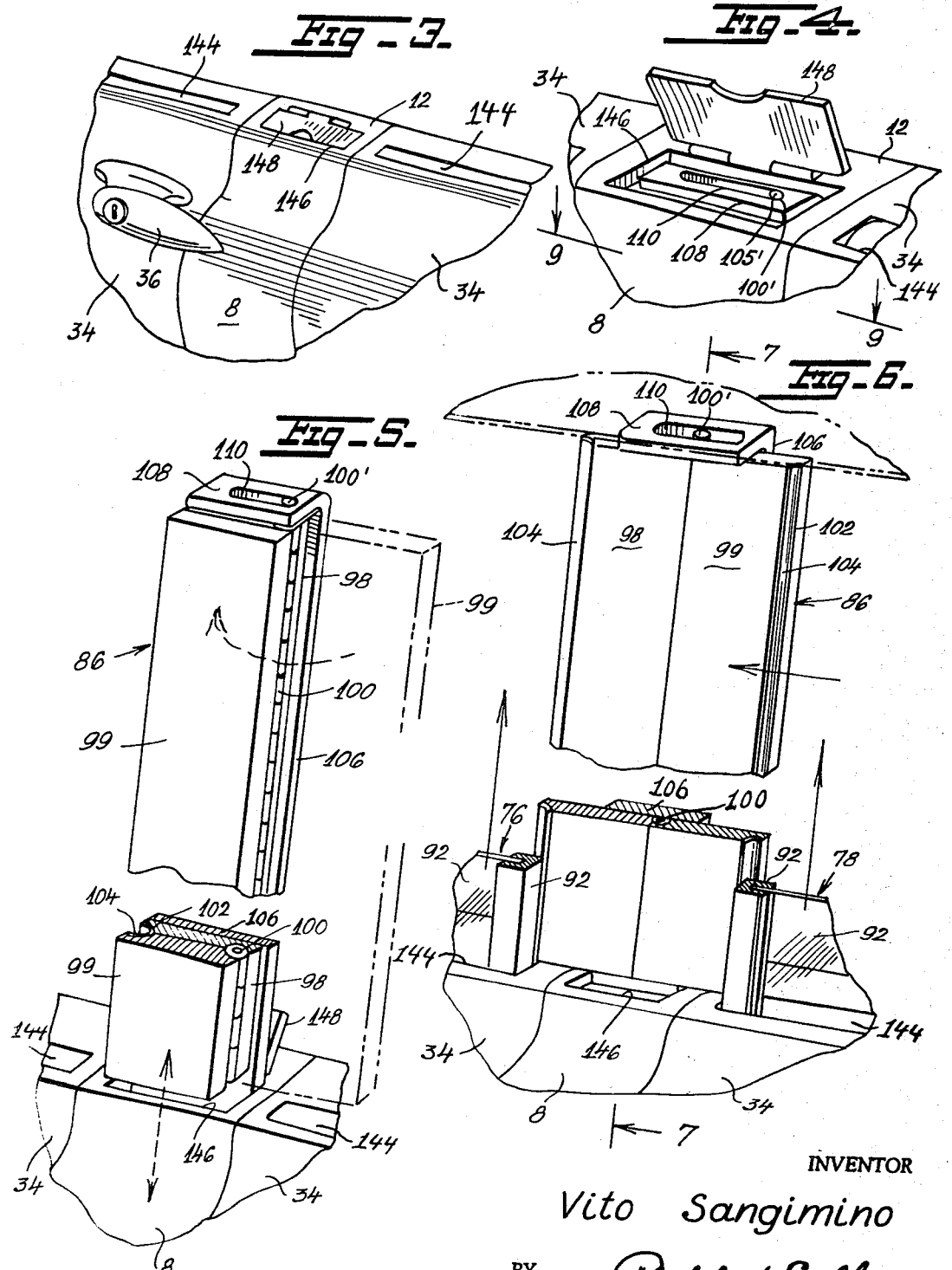

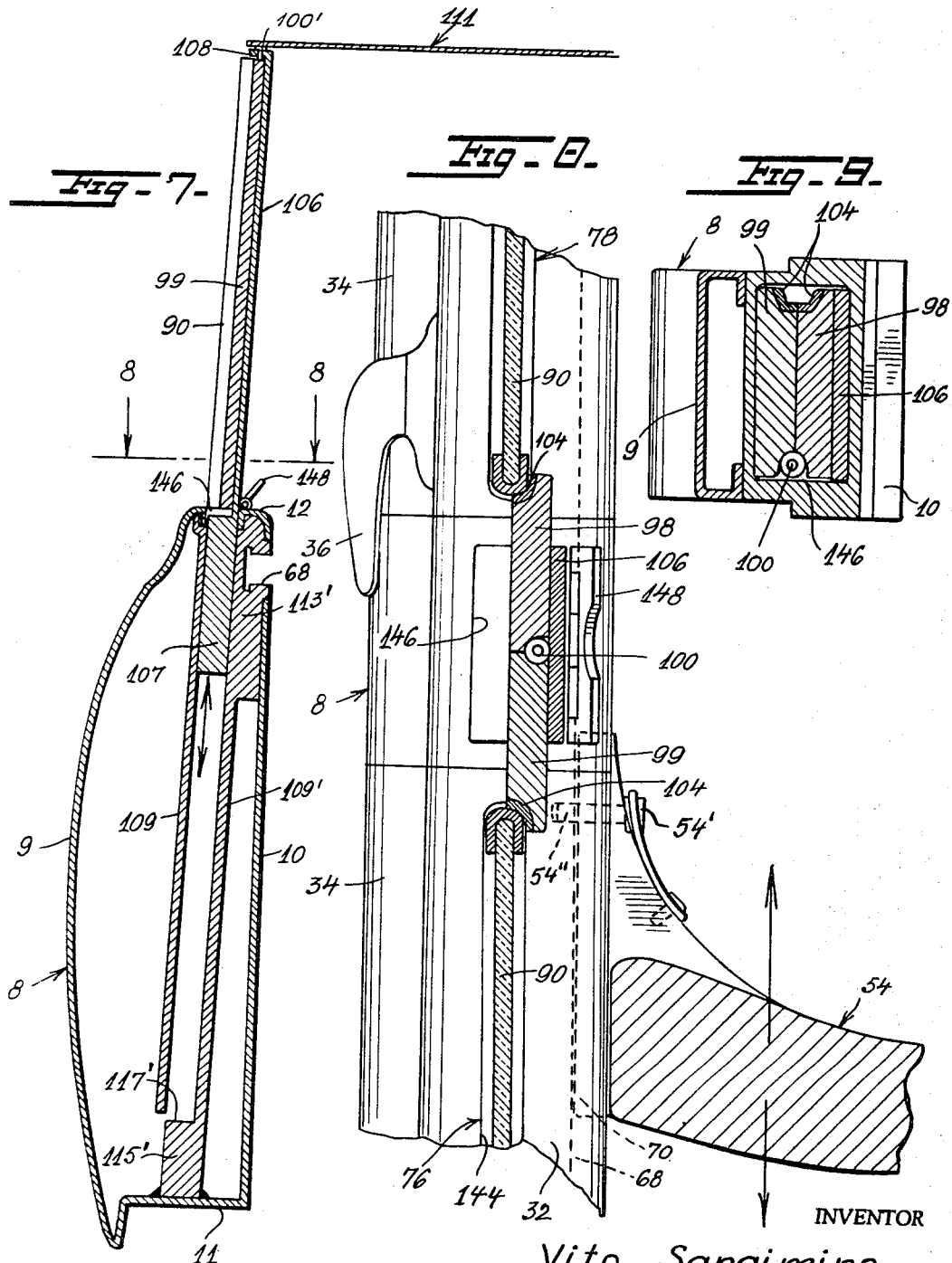

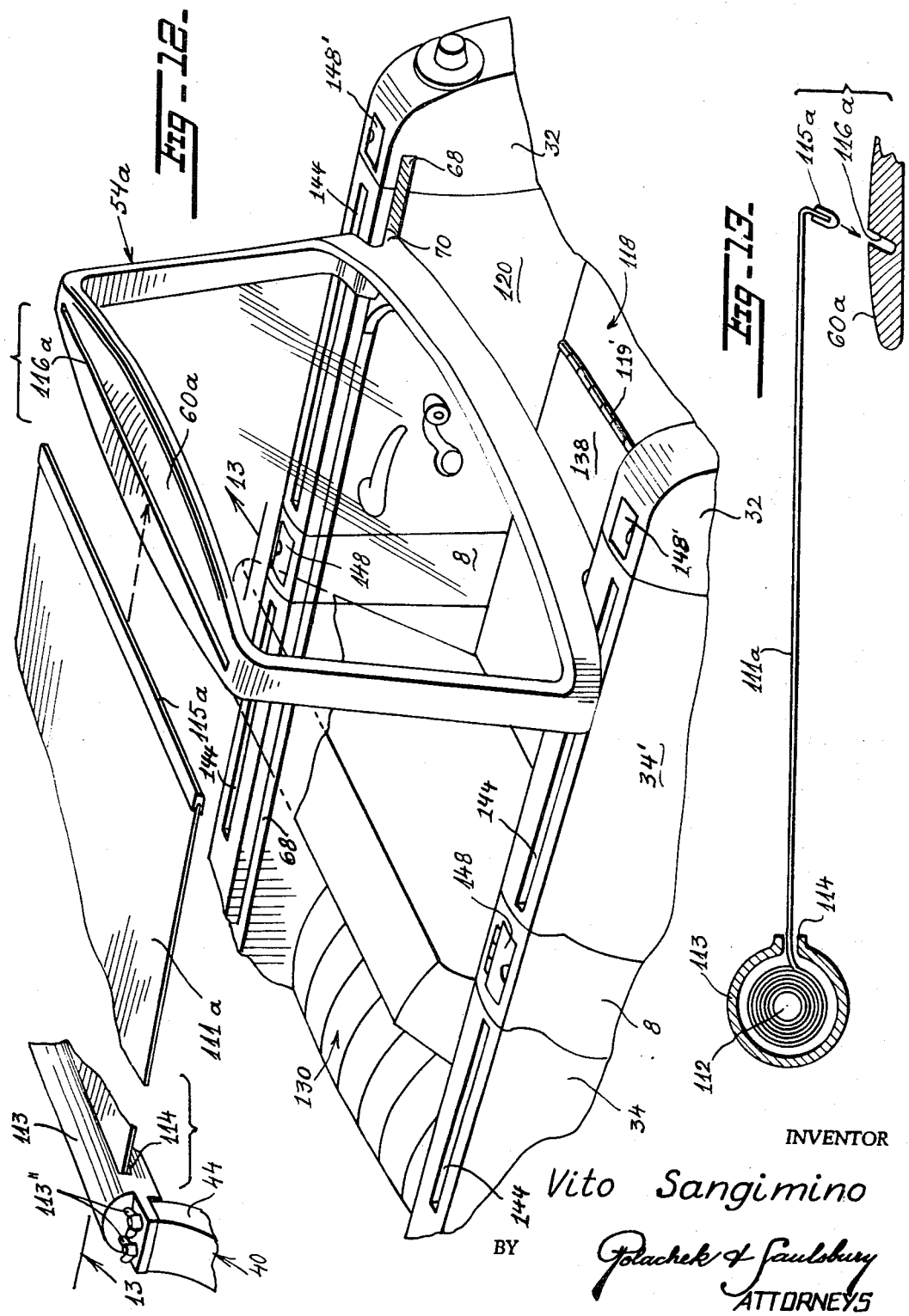

Dec. 31, 1968   V. SANGIMINO   3,419,304
AUTOWAGON
Filed Jan. 16, 1967   Sheet 6 of 7
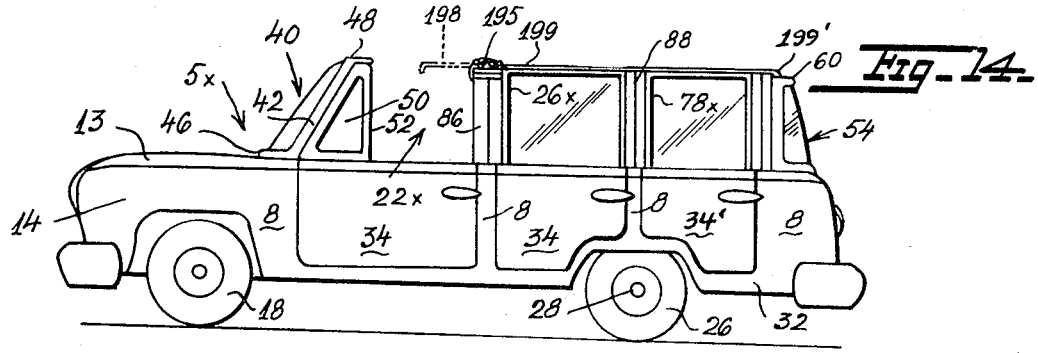
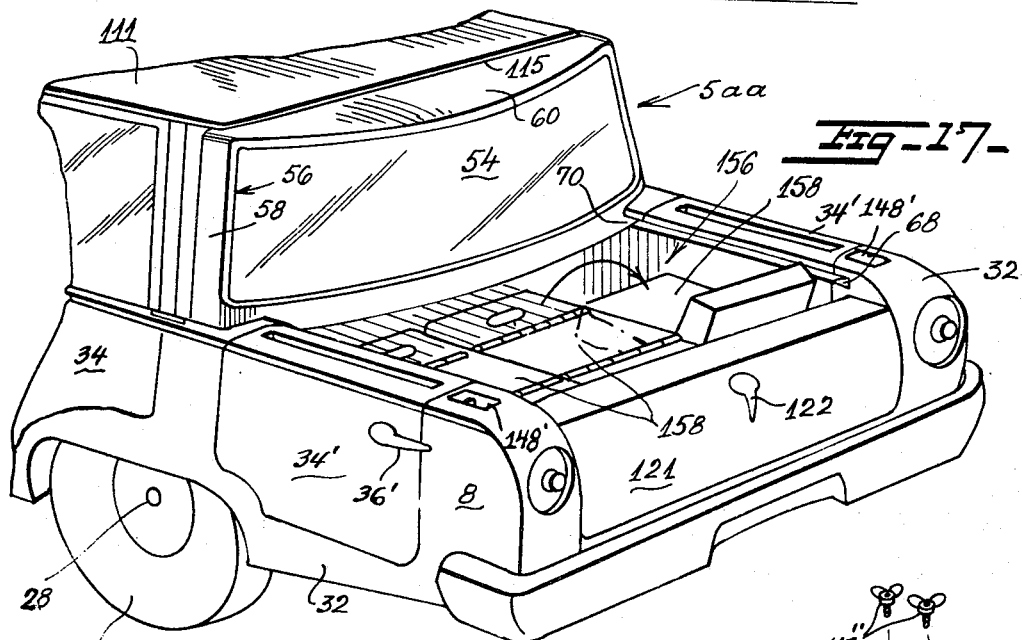
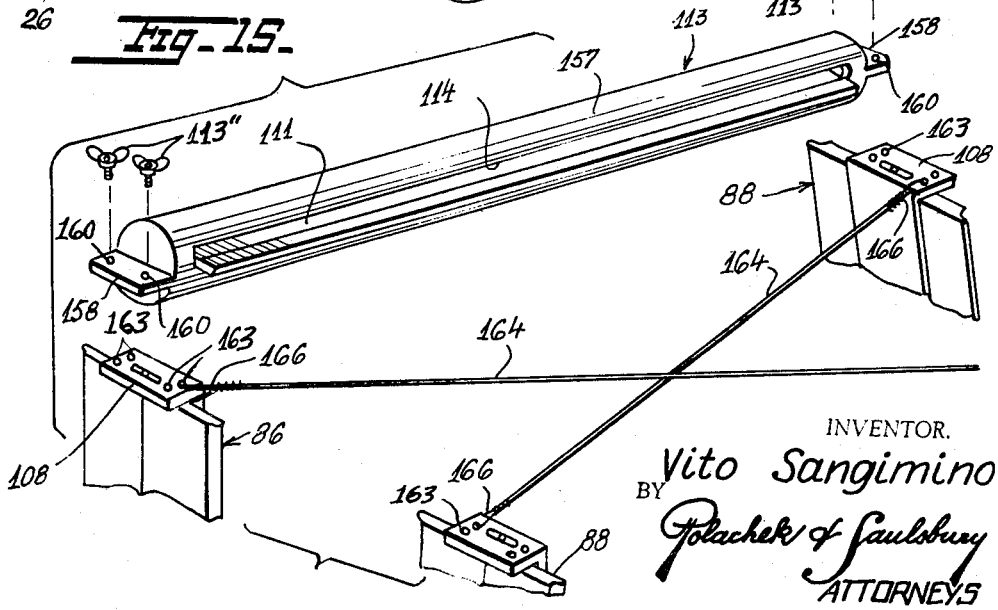
INVENTOR.
Vito Sangimino
BY Polachek & Saulsbury
ATTORNEYS

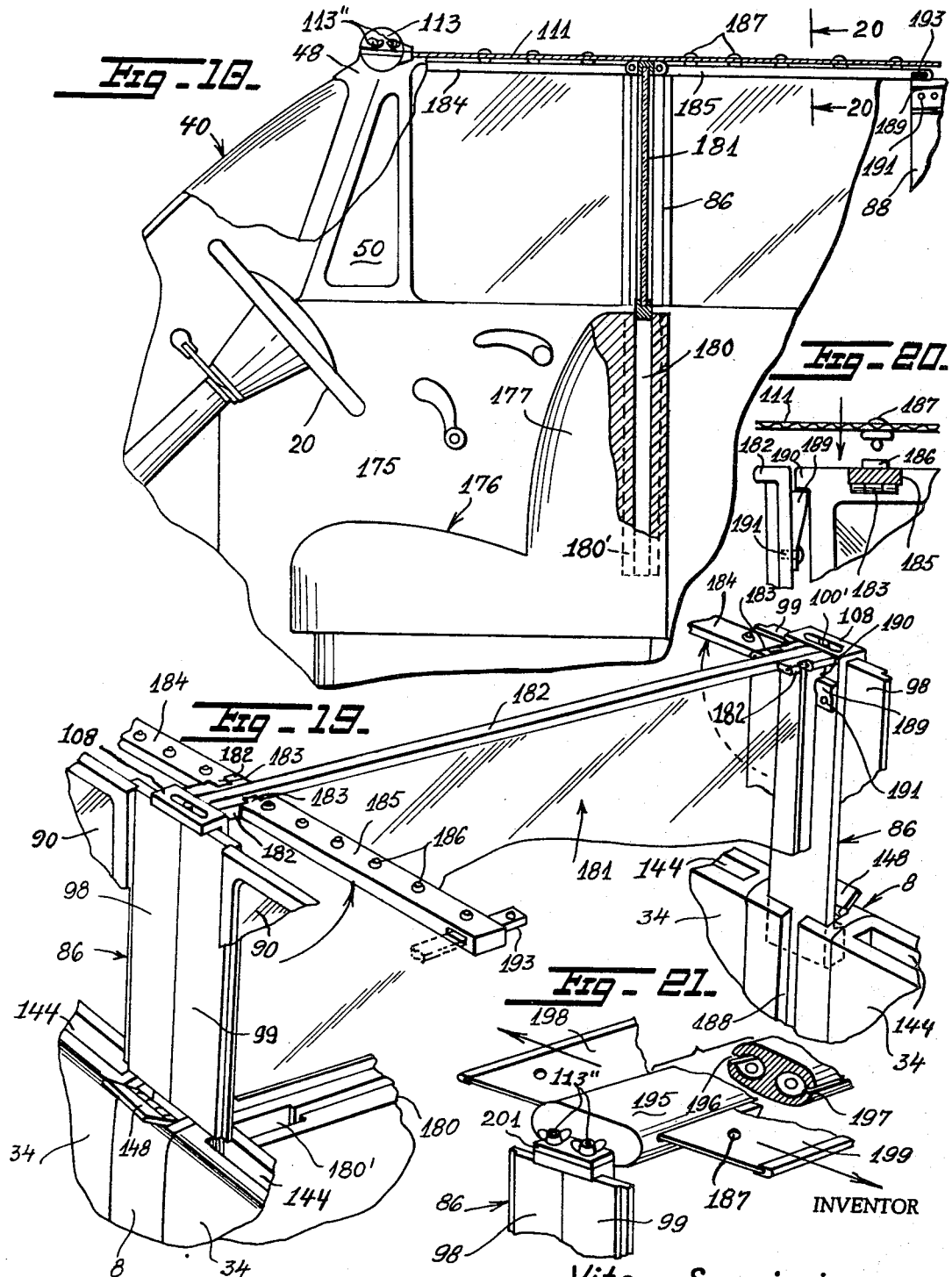

United States Patent Office 3,419,304
Patented Dec. 31, 1968

3,419,304
AUTOWAGON
Vito Sangimino, 268 Bay 20 St., Brooklyn, N.Y. 11214
Filed Jan. 16, 1967, Ser. No. 609,474
12 Claims. (Cl. 296—99)

ABSTRACT OF THE DISCLOSURE

This is a convertible type automobile, which may be termed an autowagon which generally comprises a chassis, side body housing, a windshield structure at the front of the housing and a rear window structure slidably connected to the inner sides of the housing and slidable fore and aft to adapt the vehicle for different style body types. A rollable top cover is supported at one location as upon the windshield structure or upon spaced top supports extended upwardly from the sides of the body and laterally extendable to receive the sides of window sash raised from the doors disposed therebetween. The top covers are pulled to any extent depending upon the areas to be covered thereby. The body style can be made not only from any of the standard body styles of automobiles but into a station wagon and pickup truck. The styles include four door sedan, limousine, brougham type bodies. Inner windows can be pulled upwardly from the seat back portions by the top cover supports and are provided with means for securing the sides of the cover to the extended sides of the body housing.

This invention relates generally to convertible-type automobiles which may be termed autowagons.

It is the principal object of the invention to provide an automobile or autowagon of this type wherein the top and sides and rear of the vehicle are adjustable in such a manner that practically all of the standard passenger body styles of the vehicles and even station wagons and pickup trucks, can be made up with little effort on the part of the owner of the vehicle from the one assembly without removal of parts and by the mere adjustment thereof.

Another object of the present invention is to provide an automobile with a rollable top for uncovering the top of the automobile and provision being made at different locations along the body to support the top roll and from which the top can be pulled fore or aft to close the top at different seating positions.

Another object of the invention is to provide an automobile with open sides and in which the body can be converted to a closed body throughout the entire length or at selected locations therealong.

Still another object of the invention is to provide an automobile with a rear window frame structure that can be adjusted fore and aft along the length of the vehicle.

A further object of the invention is to provide an automobile of this type that will have a rumble seat.

A further object of this invention is to provide a convertible type automobile which cannot only have different closed body styles but can be converted to and from station wagon and pickup truck body styles without actual removal of the closure parts and merely by adjustment thereof.

A still further object of the invention is to provide an automobile of the type having a top cover support post with novel retractable means for supporting the cover in its extended position.

A still further object of the invention is to provide an automobile of this type with collapsible seats for permitting the conversion of the vehicle to a station wagon and pickup truck type bodies wherein floor space is needed.

A still further object is to provide an automobile of this type in which the seat backs may house an inner window adapted to be lifted with the vertical top cover support posts.

A still further object of the invention is to provide an automobile of this type in which the top cover support posts will have hinged members adapted when hinged upwardly to be rested on the posts or sides of the automobile and having snap fastening elements for receiving cooperating fasteners on the sides of the cover to hold the extended cover in place at the sides of the body.

A still further object of the invention is to provide an automobile of this type with a container adapted to house double top cover rollers so with one installation of the roller upon the top supports a top cover can be pulled forwardly and a top cover can be pulled rearwardly.

Broadly, the invention includes an automobile with a flexible rollable roof cover that may be secured to the fixed stationary frame of the windshield of the vehicle or locations therebetween and pulled and locked to the rear window structure, the windshield structure, or at other locations.

A similar flexible rollable roof cover is provided for the trunk compartment. The side windows and posts serving to support the roof cover are adapted to disappear in the side of the body of the automobile, thereby converting the closed body to an open body or part closed body and part open body. Collapsible back seats are provided as well as a rumble seat with a side door access thereto.

For further comprehension of the invention and of the objects and advantages thereof, reference may be had to the following detailed description and accompanying drawings and to the appended claims in which the various novel features of the invention are more particularly set forth.

In the accompanying drawings forming a material part of this disclosure:

FIGURE 1 is a top perspective view of the automobile with the cover and side parts arranged to provide a four-door sedan type of a body.

FIG. 2 is an enlarged fragmentary longitudinal sectional view of the automobile taken generally on line 2—2 of FIG. 1 and looking in the direction of the arrows thereof.

FIG. 3 is a fragmentary perspective view showing the top of the side housing with a combined top cover and window sash post retracted therein to provide an open side body.

FIG. 4 is a view similar to FIG. 3 showing the closure plate for the post well lifted to provide access thereto.

FIG. 5 is a fragmentary perspective view of the post for supporting the top cover and window sashes extended upwardly from the side body housing in its folded condition and dash lines illustrating how the post sections are extended laterally to retain the post in its elevated position.

FIG. 6 is a view similar to FIG. 5 showing the post in its full laterally extended condition and slid forwardly into its operative position with the window sashes being shown raised and joining the sides of the opened post.

FIG. 7 is a vertical sectional view taken generally on line 7—7 of FIG. 6, the support post being elevated from its well in the housing section.

FIG. 8 is an enlarged cross-sectional view taken on line 8—8 of FIG. 7, a part of the rear window structure being shown advanced to the raised post location.

FIG. 9 is a cross-sectional view of the top support post and post well, the view being taken generally on line 9—9 of FIG. 4.

FIG. 10 is a perspective view similar to FIG. 1 showing the rollable top extended rearwardly to the full extent of the automobile and body parts arranged to provide a station wagon.

3

FIG. 11 is a side elevational view showing the rear window structure advanced to the front seat and body parts arranged to provide a pickup truck.

FIG. 12 is a fragmentary collective perspective view of the rear of the vehicle and illustrating the manner in which the rear window structure is shifted fore and aft along the sides of the body housing and the roof cover is fastened to the top thereof.

FIG. 13 is a sectional view rollable top assembly taken generally on line 13—13 of FIG. 12.

FIG. 14 is a side elevational view of the automobile with the body parts arranged and the top extended from front side posts to provide a brougham type of vehicle with an open driver's compartment.

FIG. 15 is a fragmentary and collective perspective view of the top cover roller assembly removed from the windshield and being applied to the top support posts with brace and support wires extending between posts.

FIG. 16 is a fragmentary collective and perspective view of a modified rear window structure on which the rollable roof cover is mounted and of a grip bar adapted to be mounted on forwardly raised posts to hold the forwardly advanced roof cover.

FIG. 17 is a rear perspective view of the autowagon with body parts arranged to provide use for the rumble seats which normally fold into the rear of the vehicle.

FIG. 18 is a fragmentary elevational view of a mid-section of an automobile showing the driver's compartment and wherein an inside window is carried in the back of the front seat that may be elevated by the slidable upright posts on which support is provided for the window when extended to support the side edges of the rollable top cover.

FIG. 19 is a fragmentary perspective view of the automobile showing in particular the raised post and inside window and extended cover supports.

FIG. 20 is a detail fragmentary view showing the manner in which the inside windshield is picked up and supported by the post, and FIG. 21 is a fragmentary perspective view showing a double roll container whereby top covers can be pulled forwardly and rearwardly.

Referring now in detail particularly to FIGS. 1 to 9, an automobile is designated generally at 5 and arranged as a four door sedan with a trunk. The automobile 5 is of the passenger type having a body 6 mounted on a wheeled chassis, 7. The body 6 has hollow side wall sections 8 with outer wall 9 and inner wall 10, joined at the bottom by bottom wall 11 and at the top by top wall 12. A hood 13 extends over the front thereof and fenders 14 partially covering front traction wheels 18. These front wheels are manually turned by a steering wheel 20 in driver's compartment 22. The steering wheel 20 is mounted on a post 24 and is operatively connected to the traction wheels by conventional steering mechanism forming part of the chassis 7. The rear traction wheels 26 are mounted on axles 28 and are driven by a forward engine 30. The rear wheels 26 are partially covered by the rear body portion 32. Spaced hollow doors 34 with handles 36 are provided at the sides for entrance to the driver's compartment 22 and passengers' compartment 38. A glass windshield structure 40 is mounted at the front of the body proper, and has frame 42 including upwardly slanting side members 44 and bottom and top horizontal frame members 46 and 48. The usual ventilating windows 50 having frames 52 are rotatably mounted rearwardly of the windshield structure 40 for ventilating purposes.

A rear glass window structure 54 and its frame 56 are slidably mounted on the top wall 12 of the side walls 8. The frame 56 is integrally formed with vertical side members 58, a horizontal cross member 60 at the top and a horizontal cross member 62 at the bottom. As best seen in FIG. 2, the upper edge of the glass is fitted in a groove 64 on the under surface of the bottom edge of the top cross member 60 and the bottom edge of the glass is fitted in a groove 66 in the top edge of the bottom cross member 62.

The rear body portions 32 have opposed elongated side grooves 68 in the inner surfaces thereof to provide guideways for lugs 70 formed integrally on the bottom cross member 62 of the frame of the rear window at the ends thereof. These grooves 68 are continuous through the doors 34 and wall sections 38 up to the driver's compartment 22. The rear window frame 56 is slidably supported by these grooves 68 in the rear body portions 32 and extend laterally over the top thereof.

The top of the automobile above the body proper between the windshield structure 40 and rear window structure 54 is enclosed by slidable window sash assemblies 76 and 78 elevated from the hollow doors 34. The window sash assemblies 76 close the driver's compartment 22 and the window sash assemblies 78, the passengers' compartment 38. The window sash assembly 76 slides between the side ventilator frame 52 as indicated at 84 and a raised combined top cover support and sash post 86. The window sash pane assembly 78 slides between the raised post 86 and another raised combined top cover support and sash post 88 spaced rearwardly therefrom. Each window sash assembly 76 and 78 includes a glass window pane 90 and a sash frame 92.

Each of the slidable window frame upright posts 86 and 88 includes a pair of juxtaposed rectangular plates 98 and 99 hinged to each other at their long meeting edges by a piano-type hinge 100. The other long edges of the plates are rabbeted as indicated at 102 and lined with rubber 104. An elongated metal plate 106, similar in shape and dimensions as the individual plates 98 and 99, is positioned behind pairs of plates 98 and 99 as viewed in FIGS. 4, 5 and 6. A block 107 is suitably fastened to each plate 106 at its bottom end and is adapted to slide between outer and inner guide plates 109 and 109' connected to the outer wall 9 and inner wall 10, respectively, of the side wall sections 8, FIG. 7. The inner guide wall 109' is formed with a block 113' at its top and with another block 115' at its bottom end providing a shoulder 117' serving as a stop for the downward movement of the block 107 on the elongated plate 106. A flange 108 is formed on plate 106 at its top end overlying the top of the folded elongated plates 98 and 99. The flange is formed with a closed slot 110 parallel to the width of the body of the elongated plates 98 and 99. A hinge pin 100' extends from the top surface of plate 98 and through the slot 110 in the flange 108 thereby interlocking the plate 106 to the plates 98 and 99. The bottom end edges of the plates 98 and 99 will rest on the top edges of the sides of the body 6 when the post 86 or 88 is raised as best seen in FIG. 7 and are adapted to be moved laterally as a unit when in such raised position, the plates 98 and 99 having been hinged open for this purpose. When the plates 98 and 99 are folded and retracted into the wall section 8, they will be supported upon the block 107 and the block 107 rested upon the shoulder 117' of block 115'.

An important feature of the invention is the construction of the top or cover 111. This top 111 is formed of flexible light metal and is rollable, so as to cover and uncover the top of the automobile. As best seen in FIG. 2, one end of the top or cover 111 is fastened to a spring roller 112 housed in a hollow cylindrical portion 113 releasably secured to the top cross piece 48 of the frame of the windshield 40 or to the upper ends of the slanting side members 44 by fastening screws 113", FIG. 12. The cylindrical portion 113 is slotted at its rear side as indicated at 114 to permit the material of the cover 111 to move inwardly or outwardly thereof. The other end of the material of the top or cover is bent as indicated at 115 and fitted in a groove 116 in the top surface of the rear top portion 60 of the frame of the slidable rear window structure 54. The rear window structure 54 is held in its adjusted position by a spring-latch pin 54a entering a side hole 54b in the grooves 68 in the side housings, see FIG. 8.

The roller 112 is preferably spring pressed so that the cover will automatically be retracted when the bent end is freed from the groove 116 of the rear window structure. When the rear window frame 56 is manually moved rearwardly the cover 111 will move therewith to extended position as shown in dash lines in FIG. 2. When in operative position, the top cover 111 rests on the window sashes 92 and slidable parts 86 and 88 on each side of the body, and may be fastened thereto by any suitable means, one such means being described in connection with the form of the invention shown in FIGS. 18 to 20.

Another important feature of the invention is the trunk compartment 118 at the rear of the body 12 of the automobile. The compartment 118 has a floor 119 and side walls 120 with the grooves 68 and is open at the top and rear. A tail gate or hinged door 121 with a handle 122 closes the rear opening. A flexible strip of metal constitutes a top cover 124 for closing the top opening in the trunk compartment 118, FIG. 2. The cover 124 has one end fixed to a roller 125 mounted in a recess 126 in the top of the door 121 with its other end bent and fitted in a groove 127 in the under edge of the bottom cross frame member 62 of the slidable rear window structure 54.

As shown in FIG. 2, a seat 130 is provided in the driver's compartment 22 and a collapsible seat 132 is provided in the passengers' compartment 38. The seat 132 has a seat portion 134 hingedly mounted on a hinge pin 136 and adapted to be swung into a recess in the floor of the body of the automobile. A back rest 138 is also swingably mounted on a hinge pin 130 and is adapted to be swung into a recess in the floor behind seat portion 134. The seat and back rest are swung from the floor to operative position in the direction of the arrows in FIG. 2.

In operation when it is desired to convert the body 6 from a body with a closed top as shown in FIG. 2, to an open top body, the bent end 115 of the top or cover 111 is manually removed from the groove 116 in the rear window frame 56, permitting the top cover 111 to be retracted by the spring pressed roller 112. The window sashes 76 and 78 are then manually lowered through slots 144 in the top of the doors 34 into the interior thereof. The top cover support and sash posts 86 and 88 may then be slid downwardly through the well opening 146 into the interior of the side wall sections 8.

In order to permit this operation, the plates 98 and 99 are slid laterally from the position of FIG. 6 to the position of FIG. 5, the plate 99 being swung clockwise as viewed in FIG. 6 into overlapping relation with the plate 98 as shown in FIG. 5. The plates 98 and 99 are now in compact form and are adapted to slide down through the opening 146 in the wall section of the body of the automobile. The well opening 146 is provided with a hinged cover as closure plate 148 which is then closed over the collapsed plates 98 and 99 as shown in FIG. 3. The rear window frame structure 54 with window pane 54 may then be manually slid rearwardly to the position shown in dash lines in FIG. 2, the cover 124 of the trunk compartment 118 winding itself around the roller 125 on the tail gate or rear door 121. Arrangements may be made to have the rear window structure 54 removed. The rear window structure 54 may also be moved forwardly to make up other arrangements.

In FIG. 10, the window sashes 76 and 78 and the novel window frames 86 and 88 and the rollable top or cover 111 are shown applied to a station wagon or limousine type of automobile as indicated at 5'. In this form, there are three pairs of top cover and window sash support posts instead of two as shown in FIG. 1, and the rear window structure 54 is fixed at its rearmost position and rear side doors 34' having sash 78' and lying between the rear structure 54 and third cover and sash post 88' similarly constructed and housed in rear wall section 8 as indicated at 148' in FIGS. 1 and 12. The top cover 111 is pulled to its rearmost position with window structure 54 and shown in dotted lines in FIG. 2. In all other respects, the automobile 5' is similar to the automobile 5 of FIG. 1 and similar reference nummerals are used to indicate similar parts.

In FIG. 11 is illustrated a pickup truck type of automobile 5", in which the posts 88 and 88' have been lowered into the wall section 8, passenger seats 132 lowered into the floor and the rear window structure 54 moved forwardly to a location immediately in rear of the driver's seat 130 and abutted against the rear of the raised posts 86. All of the housing parts having merely been adjusted and unremoved to provide this pickup truck arrangement.

In FIGS. 12 and 13, a different form of attachment of top cover 111a to the rear window frame structure 54a is shown. In this form, the free end of the cover 111a is finished off with a channel-shaped stiffening device 115a fixed along the edge thereof. This stiffening device is adapted to be inserted into a groove 116a on the top cross frame member 60a of the rear window frame structure 54a. The groove 116a is cut at a slight angle to the vertical as best seen in FIG. 13 to insure adequate connection with the cross frame member 60a.

In FIG. 14, a modified station wagon or brougham type of automobile 5x is illustrated and differs from the form of station wagon shown at 5' of FIG. 10 in that the window sashes 76 and a double rollable top container 195 such as shown in detail in FIG. 21 has been mounted on the post 86 and a pull top cover 199 applied only to the passenger compartment 38, leaving the driver's compartment 22 exposed. A forward pull cover 198 can be pulled forwardly over the driver's compartment 22 if desired and fastened into a groove not shown but provided in the top of the windshield structure or into a grooved bar 200 shown in FIG. 16 and fixed by the thumb screws 113" in the manner best illustrated in FIG. 12 to the top 48 of the windshield structure 40. The pull cover 199 is secured in the above described manner at 199' in the top of the rear window structure 54.

The double roller container 195 has opposite slots 196 and 197 from which top covers 198 and 199 are respectively pulled. This container 195 is similarly connected to a support post 86 or 18 by its flanges 201 and fastening thumb bolts 113".

In the modified form of passenger automobile 5aa shown in FIG. 17, the trunk compartment 118 of the automobile 5 of FIG. 1 has been constructed as a rumble seat compartment 156. The rumble seat includes three hinged and collapsible rumble seats 158, one of which is shown in upright operative position and the other two in collapsed condition. Doors 34' with handles 36' are provided for access to and exit from the rumble seat compartment 156.

In all other respects, the arrangement 5aa of FIG. 17 is similar to the automobile 5 of FIG. 1 and similar reference numerals are used to indicate similar parts.

In FIG. 15, there is shown more in detail the top roll cover container 113 for supporting the cover 111. In this form shown, the container 113 is separated from the top of the windshield 40 and shows how the same is fastened to the top of the support posts 86, 88 or 88' with the thumb bolts 113". A flange 158 projects radially from each end of the container body and is provided with a pair of spaced holes 160 to receive thumb bolts 113' for fastening the container 113 to the top flange 108 of the support posts 86 or 88 and into thread holes 163 thereof. The top cover 111 in addition to being stretched along the top and fastened to the top of the rear frame window frame by means of the groove 115 therein, is supported by wires 164 extending across the top of the body of the automobile between pairs of side posts 86 and pairs of posts 88. The ends of the wires 164 are looped as indicated at 166 through holes 163 in the flanges 108 of the posts.

In FIG. 16, a modified rear window structure 54b is provided at its top with side end raised projections 167 and 168 to which a top cover container 113 can be adapted by the thumb bolts 113''. The cover 111a therein has a channel-shaped stiffening device 115a as shown in FIGS. 12 and 13, and the device 115a can be secured in a groove 200' of a grooved bar 200 that is attached by the thumb bolts 113'' on a post 88 or 86 or even on the windshield structure 40. By this modification, it will be seen that the roof roller can be applied to the window structure and pulled forwardly or to a pair of posts as has been described and pulled forwardly so as to either partially or fully cover the compartments of the automobile, the grooved bar 200 can be placed at any location along the length of the vehicle.

In FIGS. 18, 19 and 20, 175 represents a driver's compartment having a front seat 176 with a back portion 177, a steering wheel 20, front windshield structure 40, ventilator windows 50, vertically slidable support posts 86 and 88 constructed as above described, and a top pull cover 111 extended rearwardly from cover roll container 113. In the back portion 177 of the seat 176, is a vertically extending opening 180 in which is stored an inner glass window 181 having a frame 182. Extending inwardly from the top of post plates 106 and straddling the window frame 182 are a pair of lateral brackets 183 to which are hingedly connected lateral top cover supports 184, 185 adapted when hinged upwardly as best seen in FIGS. 18 and 19 to extend forwardly and rearwardly and having snap elements 186 thereon adapted to cooperate with corresponding snap elements 187 in the top cover 111 as best illustrated in FIG. 20. To accommodate the cover supports 184, 185 within the vertical opening 180 in the seat back 177, the opposite side ends of the opening 180 are enlarged as best indicated at 180' in FIG. 19. When the members 184 and 185 and the window 181 are lowered into the window opening 180, these members will slide into the expanded portions 180' of the opening 180 with the window 181. The side edges of the window frame 182 will as indicated ride downwardly into slots 188 in the inner walls 10 of the wall sections 8 that house the vertically slidable cover support posts 86 or 88.

To elevate the window 181 from the opening 180 in the seat back 177 a shoulder member 189 is screw fastened to the inner face of the plate 106, post 86 or 88 adjacent its upper end and is adapted to engage with a shoulder projection 190 on the side edge of the window frame 182 whereby as the posts 86 or 88 are lifted together at the opposite sides of the vehicle the window will be raised and supported by the posts in its raised position. The window 181 will have been elevated out of the opening 180 to the position shown in FIG. 19. The posts and the window are held in the elevated position by the hinging outwardly of the vertically foldable plates 98 and 99 of the post 86 or 88 on the manner above described. If it is desired to leave the window 181 in the opening, the shoulder members 189 can be removed or adjusted from the side edges of the post plate 106 by removing or loosening screws 191 that fix the shoulder 189 to the post plate 106.

When the posts 86 or 88 are extended, the cover support members 184 and 185 will be elevated and are held in their elevated position by a latch member 193 provided on the outer ends of the hinged members and adapted to be slid laterally over the windshield and top of post ends as best shown in FIG. 18. Thereafter, the snap elements 187 can be pressed home into the snap elements 186 on the hinged members so that the cover 111 will be retained at the side edges of the automobile. Also the back seat window arrangement shown in FIGS. 18, 19, and 20 can be best used in type of arrangement shown in FIG. 14 in order to separate the driver's and passengers' compartments, but can also be provided in the other areas to be isolated or fully compartmentized, with rigid passenger seats being used to provide the interior window storage opening.

While there has been illustrated and described the preferred embodiment of the invention, it is to be understood that it is not intended to be limited to the precise constructions herein disclosed and that various changes and modifications may be made within the scope of the invention as defined in the appended claims.

What is claimed is:

1. In a convertible automobile of the kind described, a chassis, traction wheels supporting said chassis, a housing body mounted on said chassis, said body having side walls with door openings therein, hinged hollow doors closing said openings, and having elevating sash, a windshield structure at the front of the body above the side walls, a rear window structure slidably adjustable along the side walls and extending thereabove, spaced vertically slidable top cover support and sash posts at the sides of the body and extendable upwardly therefrom, between doors to receive the window sash, and a rollable top cover within a housing structure interchangeably mountable upon either said windshield, posts or rear window structure and adapted to be pulled over the top of the body, said posts, slidable window sashes and windows, the said rollable top adapted to disappear into the housing to convert the closed body to a body open at the sides and top over the full area or any portion thereof.

2. In a convertible automobile as defined in claim 1, characterized by a trunk compartment in the body at the rear thereof, said trunk compartment being open at the top, a hinged door for closing the rear of the trunk compartment and a second rollable top extending between the hinged trunk door and the rear window structure for closing the open top of the compartment.

3. In a convertible automobile as defined in claim 1, wherein the side walls have opening in the top edges thereof, hinged doors closing said openings, said posts each consisting of a pair of rectangular plates vertically hinged to each other along adjacent long meeting edges thereof and adapted to be folded into overlapping relation, above the openings in the top edges of the side walls, another plate positioned behind the pair of hinged plates, said other plate extending through the openings in the top edge of the side walls, a block fastened to the inner end of the other plates to support the folded hinge plates when lowered into the wall sections, a flange on the outer end of the other plates, said flanges having a slot therein, and a pin protruding upwardly from the top end edge of said hinged plates, said pin extending through the slots for interlocking the other plate of the hinged plates, said hinged plates adapted to be opened and rested upon the top of the side walls to support the post against inward and downward movement when the posts have been elevated, said hinged plates adapted to slide through the openings in the top edges of the side walls when in overlapped position, the other long edges of the hinged plates being rabbeted forming trackage for movement of the window sashes.

4. In a convertible automobile as defined in claim 1, wherein the body is provided with a floor interiorly thereof, said floor having openings therein and collapsible passenger seats supported on the floor and adapted to be nested in the openings in the floor in inoperative position.

5. In a convertible automobile as defined in claim 1, wherein the rollable top cover is constituted by a flexible metal strip having one end wound on a roller in the said housing at the top of the windshield frame, the rear slidable window frame having a transverse groove adapted to receive and hold the other end of the strip.

6. In a convertible automobile as defined in claim 2, wherein the rollable top cover for the trunk compartment is constituted by a flexible metal strip having one end wound on a roller in a recess in the free end of the rear door closing the trunk compartment, the other end of the strip being anchored in a groove in bottom of the frame of the rear slidable window.

7. In a convertible automobile as defined in claim 2, wherein the slidable rear window structure has a groove therein, a hollow cylindrical container removably secured to the top of the windshield frame, a roller in said container, said rollable top constituted by strip of flexible metal wound at one end on said roller, the other end of the strip being adapted to be embedded in the groove in the frame of the rear window structure, the rollable top closing the open top of the trunk compartment constituted by a strip of flexible metal material wound at one end on a roller in a recess in the hinged door, the other end of the strip adapted to be embedded in the bottom of the frame of the rear window structure.

8. In a convertible automobile as defined in claim 1, characterized by a rumble seat in the body at the rear thereof, said rumble seat having collapsible seats and side openings and a hinged door closing the side openings to provide access to and exit from the rumble seat.

9. In a convertible automobile as defined in claim 8, wherein the housing for the roller is detachable from the windshield frame and may be secured to the support posts, and wires stretched across the top between the posts on both sides of the body for supporting the rollable top cover when in stretched operative closing position over the support posts of the body, and a detachable grooved bar adapted to be attached to any of the support posts or windshield and rear window structure to retain the free ends of the top cover.

10. In a convertible automobile as defined in claim 1, and fore and aft cover members hinged to the upper ends of the support posts at the top and adapted to be raised when posts are elevated and their free ends rested upon other posts or structure and to extend longitudinally thereover and under the sides of the top cover, said cover members having fastening elements and said top cover having cooperating fastening elements engageable with the fastening elements of the hinged member whereby to support and secure the sides of the cover over the sides of the body.

11. In a convertible automobile as defined in claim 1, having a seat back portion with an interior window containing opening, an interior window mounted in said opeing and means upon the support posts engageable with the sides of the interior window to elevate and support the window out of the opening and above the seat back portion.

12. In a convertible automobile as defined in claim 1, and a double top roll adapted to be supported to the top cover support intermediate the windshield and rear structure and having top covers adapted to be pulled forwardly and rearwardly thereof.

References Cited

UNITED STATES PATENTS

| | | | |
|---|---|---|---|
| 1,505,332 | 8/1924 | Gravel | 296—99 |
| 1,746,573 | 2/1930 | Alexander | 296—99 |
| 1,924,030 | 8/1933 | Elser | 296—99 |

PHILIP GOODMAN, *Primary Examiner.*

U.S. Cl. X.R.

52—66; 160—241